3,033,827
LINEAR POLYESTERS OF 1,4-CYCLOHEXANE-DIMETHANOL AND AMINOALCOHOLS
Charles J. Kibler, Alan Bell, and James G. Smith, Kingsport, Tenn., assignors to Eastman Kodak Company, Rochester, N.Y., a corporation of New Jersey
No Drawing. Filed June 29, 1959, Ser. No. 823,296
19 Claims. (Cl. 260—77)

This invention relates to highly polymeric linear condensation of polymers of at least three constituents as follows: 1,4-cyclohexanedimethanol (cis or trans isomers), a dicarboxylic acid and an aminoalcohol. These polymers are valuable as fibers, films, molded articles, coating materials, etc. and are characterized by excellent overall properties including high melting temperatures, hydrolytic stability, etc.

This application is a continuation in part of Kibler et al. Serial No. 554,639 filed December 22, 1955, now U.S. Patent No. 2,901,666, granted on August 25, 1959, wherein the claims cover polyesters generically as well as polyester-amides wherein one of the continuents is a diamine. Kibler et al. Serial No. 823,298 filed on even date herewith covers polymers wherein one of the principal constituents is a hydroxycarboxylic acid. Kibler et al. Serial No. 823,295 filed on even date herewith covers polymers wherein one of the principal constituents is an aminocarboxylic acid. Kibler et al. Serial No. 823,297 filed on even date herewith covers relatively low molecular weight polymers; especially polyesters, which are useful as plasticizers, lubricants, etc. The specification and file history of the parent application discusses the prior art and the unobviousness of the subject matter of these inventions.

The properties of the polymers of the present invention include unexpectedly high melting temperatures, chemical stability, physical stability, dyeability, etc. More specific properties include weather resistance, resistance to heat distortion, hydroxylic stability which is an important factor in weathering, utility as a dielectric or as to other electrical properties under humid conditions, dyeability to deep shades without the use of a carrier, etc.

The objects of the present invention include providing polymers of the components mentioned above having the advantageous properties enumerated as well as products produced therefrom as described. Other objects will become apparent elsewhere herein.

According to a preferred embodiment of this invention polymers are provided which are linear highly polymeric condensation polymers of (A) at least one dibasic carboxylic acid, (B) at least one bifunctional dihydroxy compound and (Y) at least one aminoalcohol, the relative proportions of (A), (B) and (Y) constituents being such as to constitute a linear polyesteramide in which at least 50 mole percent of said component (B) consists of at least one member selected from the group consisting of the cis and trans isomers of 1,4-cyclohexanedimethanol, which polymer melts at about 100° C. and below about 330° C., has an inherent viscosity of at least 0.4 as measured in a mixture of 40% tetrachlorethane plus 60% phenol and is capable of being formed into fibers.

Generally the inherent viscosity of the polymers of this invention lie in the range of 0.4–2.0 although higher or lower values are also contemplated.

The bifunctional reactants or constituents which are employed to prepare the polymers of this invention contain no other reactive (functional) substituents which would interfere with the formation of linear polymers as defined by Carothers in his earlier work in this field. Such bifunctional reactants and the methods for preparing polymers from them are well known in the art and illustrated in numerous patents and in the literature as well as in the parent patent application of which this is a continuation in part.

As used in this specification the term 1,4-cyclohexanedimethanol includes either or a mixture of both cis and trans isomers. The preferred usage is at least 50 percent of the trans isomer. The letters CHDM have the same meaning. A useful mixture of isomers is about 70% trans plus 30% cis.

Examples of the constituents which constitute the polymers of this invention include constituents designated above as (A), (B) and (Y), with possible minor amounts but preferably none of (X) and (Z) constituents as follows:

(A) DIBASIC CARBOXYLIC ACIDS

These include aromatic, aliphatic, heterocyclic and other types and include cycloaliphatic acrylic, hexacarbocyclic, tetracarbocyclic, bicyclic, etc. Examples include terephthalic, cyclohexanedicarboxylic, succinic, naphthalenedicarboxylic, norcamphanedicarboxylic, carbonic, dimerized fatty acids, trimerized fatty acids, p-carboxycarbanilic, suberic, azelaic, adipic, sebacic, glutaric, dimethylmalonic, α-ethylsuberic, oxalic, α,α-diethyladipic, dicarboxy diethyl ether, ortho-phthalic, hexahydro-o-phthalic, sulfonyldipropionic, and many other such acids. Examples of especially preferred hexacarbocyclic dicarboxylic acids wherein the carboxy radicals are attached to a hexacarbocyclic nucleus in para relationship include terephthalic acid, trans-1,4-cyclohexanedicarboxylic acid, p,p'-sulfonyldibenzoic acid, 4,4'-diphenic acid, 4,4'-benzophenonedicarboxylic acid and 1,2-di(p-carboxyphenyl) alkanes (1 to 10 carbons). Such acids as are contemplated by constituent (A) generally contain from about 1 to 40 carbon atoms.

(B) DIHYDROXY COMPOUNDS

These include aromatic, aliphatic, heterocyclic, and other types as in regard to constituent (A). Preferably the hydroxy radicals are attached to a methylene group as in a glycol, i.e., the compound is a dihydroxymethyl compound such as ethylene glycol, 1,10-decanediol, neopentyl glycol, 1,4-bishydroxymethylbenzene, norcamphenedimethanol, etc. Other dihydroxy compounds include hydroquinone, dihydroxynaphthalene, resorcinal, etc. Such compounds generally contain from 2 to 20 carbon atoms if they are monomeric in nature; however, the dihydroxy compounds contemplated also include the polyethylene glycols, other low polymers which are bifunctional and may contain internal ether, thioether, sulfone, carboxy, urethane and other linkages such as polystyrene which has been hydroxylated so as to acquire two hydroxy radicals. Any such polymeric dihydroxy compounds preferably have a molecular weight of less than 10,000, most preferably from about 700 to about 7,500. Additional specific examples include 2-methyl-1,5-pentanediol, diethylene glycol, triethylene glycol, 2,2-dimethyl-3-isopropyl-1,3-propanediol, etc.

As already pointed out, constituent (B) is composed of at least 50 mole percent of CHDM, whereby the advantageous results of this invention are accomplished.

(X) HYDROXYCARBOXYLIC ACIDS

These include aromatic, aliphatic, heterocyclic and other types as in regard to constituent (A) and include lectones. Specific examples include 2,2-dimethyl-3-hydroxypropionic acid, its cyclic lactone, pivalolactone, omega-hydroxycaproic acid, juniperic acid also known as omega-hydroxypalmitic acid, butyrolactone, 4-hydroxybutyric acid, 4(β-hydroxyethyl)-benzoic acid, 2-(β-hydroxyethoxy)benzoic acid, 4-hydroxymethylbenzoic acid, 4-hydroxymethylcyclohexanecarboxylic acid, 4-(β-hydroyethoxy)-cyclohexanecarboxylic acid, etc. Generally these hydroxycarboxylic acids contain from 2 to 20 carbon atoms.

(Y) AMINOALCOHOLS

These include aromatic, aliphatic, heterocyclic and other types as in regard to constituent (A). Specific examples include 5-aminopentanol-1, 4-aminomethylcyclohexanemethanol, 5-amino-2-ethyl-pentanol-1, 2-(4-β-hydroxyethoxyphenyl)-1 - aminoethane, 3 - amino - 2,2 - dimethylpropanol, hydroxyethylamine, etc. Generally these aminoalcohols contain from 2 to 20 carbon atoms.

(Z) AMINOCARBOXYLIC ACIDS

These include aromatic, aliphatic, heterocyclic, and other types as in regard to constituent (A) and include lactams. Specific examples include 6-aminocaproic acid, its lactam known as caprolactam, omega-amino-undecanoic acid, 3-amino-2,2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)-cyclohexanecarboxylic acid, etc. Generally these compounds contain from 2 to 20 carbon atoms.

The molar proportions of the various constituents in the polymers of this invention are apparent to those skilled in the art. Generally speaking there are equal molar proportions of (1) the (A) constituent and (2) the sum of the (B) and (Y) constituents. The sum total of the molar quantities of (X), (Y) and (Z) are advantageously no greater than 60% of the molar amount of the (A) constituent; however, the (Y) constituent never exceeds the (B) constituent. According to the present invention, constituent (Y) is from about 10 to 50 mole percent of constituent (A), the sum of constituents (X) and (Z) is from 0 to 10 mole percent of constituent (A) and the molar amount of constituent (B) is reduced by the molar amount of constituent (Y).

The preparation of the polymers can be accomplished by melt phase or solid phase techniques as described in the parent application, in the prior art and in the examples below. The methods for forming fibers, film, molded products are similarly apparent.

This invention can be further illustrated by the following examples of preferred embodiments, although it will be apparent that these examples are included merely for purposes of illustration and are not intended to limit the scope of the invention unless otherwise specifically indicated.

Example 1

A flask equipped with stirrer, nitrogen inlet, thermometer and distilling head was charged with 46.6 g. (0.24 mole) of dimethyl terephthalate and 5.2 g. (0.06 mole) of 5-aminopentanol-1. The mixture was stirred under nitrogen and heated at 180–190° C. for 2 hours during which time 2 ml. of methanol was evolved. The solution was cooled and 49.5 g. (0.24 mole) of 1,4-cyclohexanedimethanol (containing 30% methanol), 0.3 ml. of a 28.4% solution of titanium tetraisopropoxide in n-butanol, and 1.0 ml. of a 1.5% solution of lithium methoxide in methanol were added. The mixture was reheated and stirred under nitrogen for 30 minutes at 180–190° C., then 30 minutes at 200–210° C. At the end of this time, 34 ml. of methanol had evolved and the reaction mass had solidified. The temperature was raised to 285° C., and when the reaction mass was completely molten, a vacuum of less than 1 mm. of mercury was applied for 5 minutes. The prepolymer was protected with a nitrogen atmosphere and poured into water. The prepolymer which melted at 260–267° C., was ground to pass a 40-mesh screen and heated at 260° C. and 0.07 mm. of mercury for 6 hours. The final polymer had a viscosity of 1.21 and was readily melt spun to strong fibers which showed a strong affinity for acid dyes.

Example 2

The procedure described in Example 1 was repeated except that the vacuum in the final step was applied to the molten prepolymer for 75 minutes instead of 5. During this time, the melt viscosity increased markedly and the final polymer had a viscosity of 0.87 and a melting point of 270–275° C.

The following table summarizes other polymer compositions prepared by the procedures of Examples 1 and 2.

| Example | Dibasic Acid | Moles of Dibasic Acid | Aminoalcohol | Moles of Amino-Alcohol | Polymer I.V. | Polymer M.P., °C. |
|---|---|---|---|---|---|---|
| 3 | Trans Hexahydroterephthalic [1] | 1.0 | 5-Aminopentanol-1 | 0.10 | 0.89 | 200–204 |
| 4 | ----do.[2] | 1.0 | ----do | 0.25 | 0.69 | 170–180 |
| 5 | Terephthalic [1] | 1.0 | 4-Aminomethylcyclohexane-methanol. | 0.25 | 0.98 | 263–270 |
| 6 | ----do.[1] | 1.0 | 2-(4-(β-hydroxyethyl)phenyl)-1-aminoethane. | 0.25 | 0.73 | 260–270 |

[1] Procedure described in Example 1.
[2] Procedure described in Example 2.

Example 7

The following example illustrates a single step preparation of the polymer. A flask was charged with 194 g. (1.0 mole) of dimethylterephthalate, 71.5 g. (0.5 mole) of 4-aminomethylcyclohexanemethanol, 86.4 g. (0.5 mole) of trans-1,4-cyclohexanedimethanol, 1.0 ml. of a 28.4% solution of titanium tetraisopropoxide in n-butanol, and 5.0 ml. of a 1.5% solution of lithium methoxide in methanol. The mixture was stirred at 200° C. under nitrogen until 70 ml. of methanol had distilled. The temperature was raised to 270–275° C. and a vacuum of less than 0.5 mm. applied. Stirring of the molten product under vacuum was continued for 75 minutes. During this time, the melt viscosity increased markedly, and the final product was cooled under a protective atmosphere of nitrogen. The final polymer had a melting point of 195–210° C. and a viscosity of 1.11.

Example 8

The procedure described in Example 7 was repeated except that the vacuum was replaced with a nitrogen atmosphere after 10 minutes. The molten prepolymer was poured into water, dried, ground to pass a 40-mesh screen, and heated at 0.07 mm. of mercury and 180° C. for 3 hours, then 195° C. for 3 hours. The final polymer had a viscosity of 1.07 and a melting point of 205–210° C.

Polymers as described above were formed into fibers which could be oriented by stretching to improve their properties if desired, especially for textile fabrics. Similarly they can be extruded to form films which can be biaxially oriented. Such films have utility for photographic purposes, wrapping materials, dielectrics, etc. Molding compositions can also be prepared from such polymers. In any of these forms the polymers are receptive to dyes without carriers. They are especially resistant to weathering. An outstanding property is their hydrolytic stability in combination with an unusually well-balanced group of other desirable properties.

Although the invention has been described in considerable detail with reference to certain preferred embodiments thereof, it will be understood that variations and modifications can be affected without departing from the spirit and scope of the invention as defined in the appended claims.

We claim:

1. A linear highly polymeric polyesteramide of (A) a dicarboxylic acid, (B) a bifunctional dihydroxy component and (Y) a mono-amino-monohydric alcohol, the relative proportions of (A), (B) and (Y) constituents being such that constituent (A) is present in a molecular amount equal to the sum of constituents (B) and (Y), the molecular amount of constituent (Y) is about 10 to 50 mole percent of constituent (A) and in which at least 50 mole percent of said constituent (B) consists of at least one member selected from the group consisting of the cis and trans isomers of 1,4-cyclohexanedimethanol, which polyesteramide melts at above 100° C. and below about 330° C., has an inherent viscosity of at least 0.4 as measured in a mixture of 40% tetrachlorethane plus 60 phenol and is capable of being formed into fibers.

2. A polymer as defined by claim 1 wherein the constituents are; (A) is terephthalic acid, (B) is 1,4-cyclohexane-dimethanol and (Y) is 5-aminopentanol-1.

3. A polymer as defined by claim 1 wherein the constituents are: (A) is trans hexahydroterephthalic acid, (B) is 1,4-cyclohexanedimethanol and (Y) is 5-aminopentanol-1.

4. A polymer as defined by claim 1 wherein the constituents are: (A) is terephthalic acid, (B) is 1,4-cyclohexanedimethanol and (Y) is 4-aminomethylcyclohexanemethanol.

5. A polymer as defined by claim 1 wherein the constituents are: (A) is terephthalic acid, (B) is 1,4-cyclohexanedimethanol and (Y) is 2-(4-$\beta$-hydroxyethylphenyl)-1-aminoethane.

6. A polymer as defined by claim 1 wherein the melting point is at least 200° C.

7. A polymer as defined by claim 1 wherein the 1,4-cyclohexanedimethanol is from 50 to 100% trans isomer.

8. A polymer as defined by claim 7 wherein at least 50 mole percent of constituent (A) is a hexacarbocyclic dicarboxylic acid wherein the caboxy radicals are attached to a hexacarbocyclic nucleus in a para relationship.

9. A fiber of a polymer as defined by claim 1.
10. A fiber of a polymer as defined by claim 2.
11. A fiber of a polymer as defined by claim 3.
12. A fiber of a polymer as defined by claim 4.
13. A fiber of a polymer as defined by claim 5.
14. A fiber of a polymer as defined by claim 6.
15. A film of a polymer as defined by claim 1.
16. A film of a polymer as defined by claim 2.
17. A film of a polymer as defined by claim 3.
18. A film of a polymer as defined by claim 4.
19. A film of a polymer as defined by claim 5.

References Cited in the file of this patent
UNITED STATES PATENTS
2,901,466    Kibler et al. _____ Aug. 25, 1959